United States Patent [19]

Kawai et al.

[11] Patent Number: 4,548,175

[45] Date of Patent: Oct. 22, 1985

[54] INTERNAL COMBUSTION ENGINE WITH TWO INTAKE VALVES

[75] Inventors: Taiyo Kawai; Nobuo Habu; Shinichi Matsumoto, all of Susono, Japan

[73] Assignee: Toyota Jidosha Kabushiki Kaisha, Aichi, Japan

[21] Appl. No.: 677,746

[22] Filed: Dec. 3, 1984

[30] Foreign Application Priority Data

Dec. 5, 1983 [JP] Japan .................. 58-228329
Dec. 19, 1983 [JP] Japan .................. 58-237961
Apr. 9, 1984 [JP] Japan .................. 59-69176

[51] Int. Cl.⁴ ...................... F02B 29/02; F02M 35/10
[52] U.S. Cl. .................... 123/308; 123/432; 123/188 M; 123/445
[58] Field of Search ........... 123/308, 432, 445, 188 M

[56] References Cited

U.S. PATENT DOCUMENTS 4,285,310 8/1981 Takizawa et al. ................. 123/308

FOREIGN PATENT DOCUMENTS

47-24041  7/1972  Japan .
52-34128  3/1977  Japan .
54-84128  7/1979  Japan .
56-54929  5/1981  Japan .
56-96118  8/1981  Japan .
56-14863  11/1981 Japan .
58-25514  2/1983  Japan .
58-28511  2/1983  Japan .
58-85319  5/1983  Japan .
58-172424 10/1983 Japan .
59-43922  3/1984  Japan ................ 123/308

Primary Examiner—E. Rollins Cross
Attorney, Agent, or Firm—Parkhurst & Oliff

[57] ABSTRACT

An internal combustion engine provided with a first port of a helical shape and second port of a straight shape opened to the combustion chamber. The first port provides a swirl motion in the cylinder, while the second port is opened to the combustion chamber at a position near the spark electrodes located at the upper portion of the combustion chamber in the center thereof. An intake control valve selectively opens or closes the second intake port in accordance with operating conditions of the engine. A main injector is arranged in the second port downstream of the intake control valve. The injector is so controlled that it opens substantially during the intake stroke when the intake control valve is closed. The injector is controlled to inject at the period substantially not located in the intake stroke.

11 Claims, 22 Drawing Figures

Fig.12a THROTTLE OPENING
Fig.12b INTAKE PRESSURE ($P_B$)
Fig.12c $f_1$
Fig.12d $f_2$
Fig.12e INTAKE CONTROL VALVE SWICHING COMMAND
Fig.12f CRANK ANGLE

INTERNAL COMBUSTION ENGINE WITH TWO INTAKE VALVES

BACKGROUND OF THE INVENTION

1. Field of the Invention

The present invention relates to an internal combustion engine provided with two intake valves for each cylinder.

2. Description of the Related Art

Known in the prior art is an internal combustion engine having a first intake port of a helical shape, a second intake port of a straight shape, and a fuel injector mounted in the second intake port (for example, Japanese Unexamined Patent Publication (Kokai) Nos. 58-204959, 58-206815, 52-34108, 54-84128, 58-1725514, and 58-172424). This type of engine aims to provide a stratified combustible mixture in the combustion chamber for allowing use of lean air-fuel mixture and for recirculating a large amount of exhaust gas, thus increasing fuel consumption efficiency and decreasing the toxic component in the exhaust gas.

In this type of engine, however, a strong flow of the combustible mixture is introduced into the combustion chamber from the second intake port during the low speed or low load conditions. At such times, the degree of stratification of the combustible mixture in the combustion chamber becomes small, resulting in unstable burning of the lean air-fuel mixture.

SUMMARY OF THE INVENTION

An object of the present invention is to provide an internal combustion engine capable of obtaining a highly stratified combustible mixture in the combustion chamber during low engine load condition in order to increase the lean limit of the combustible mixture to be burnt and to increase the ratio of the exhaust gas to be recirculated.

According to the present invention, there is provided an internal combustion engine including: a cylinder block defining a cylinder bore; a cylinder head arranged on the cylinder block; a piston movably arranged in the cylinder bore so that a combustion chamber is formed between the cylinder block, cylinder head, and the piston; the cylinder head having a first intake port of a helical shape and a second intake port of a straight shape; a first intake valve arranged between the first intake port and the combustion chamber, a second intake valve arranged between the second intake port and the combustion chamber, the cylinder head having at least one exhaust port; an exhaust valve arranged between the exhaust port and the combustion chamber; intake valve control means for controlling the operation of the first and the second intake valves; exhaust valve control means for controlling the operation of the exhaust valve; a spark plug having a spark gap located in the combustion chamber at its top portion in the center; intake pipe means connected to the first and second intake ports for introduction of intake air; intake control valve means for controlling the supply of air from the intake pipe means to the second intake port of a straight shape; actuator means responsive to operating conditions of the engine for controlling the opening of the intake control valve means; main injector means for generating a flow of fuel in the second intake port; first injection control means for controlling the fuel injection from the main injector means in such a manner that the flow of fuel is injected substantially at the intake stroke of the piston when the intake control valve is closed; and second injection control means for controlling the main fuel injection from the injector means in such a manner that the flow of fuel is injected at a crank angle area substantially other than that of the intake stroke.

BRIEF DESCRIPTION OF THE DRAWINGS

FIGS. 1, 1A and 1B are a general schematical view of an internal combustion engine according to the present invention;

FIGS. 8 to 11, 11A and 11B are flow charts indicating the software construction of the present invention;

FIGS. 12a–h are timing chart showing how the present invention operates; and

DESCRIPTION OF THE PREFERRED EMBODIMENTS

Figure 1A:
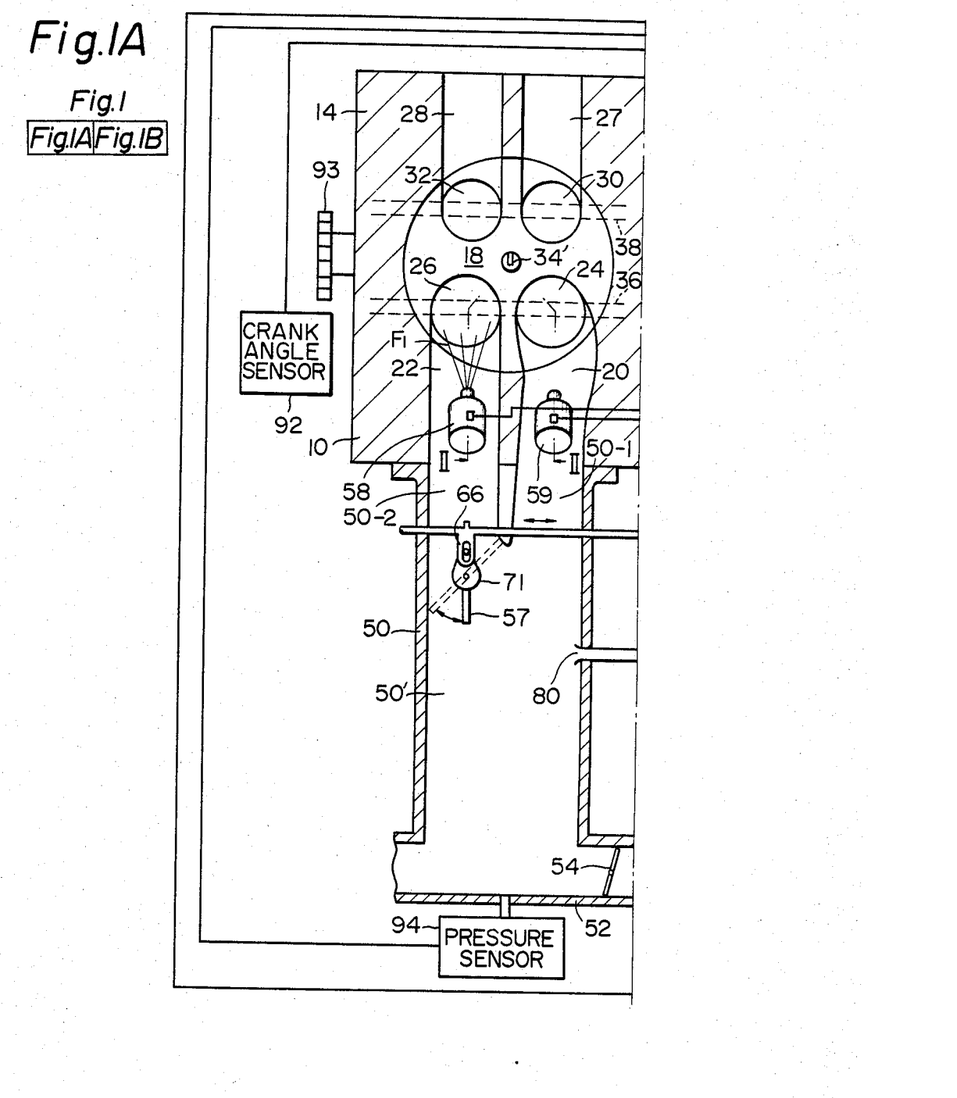
Figure 1B:
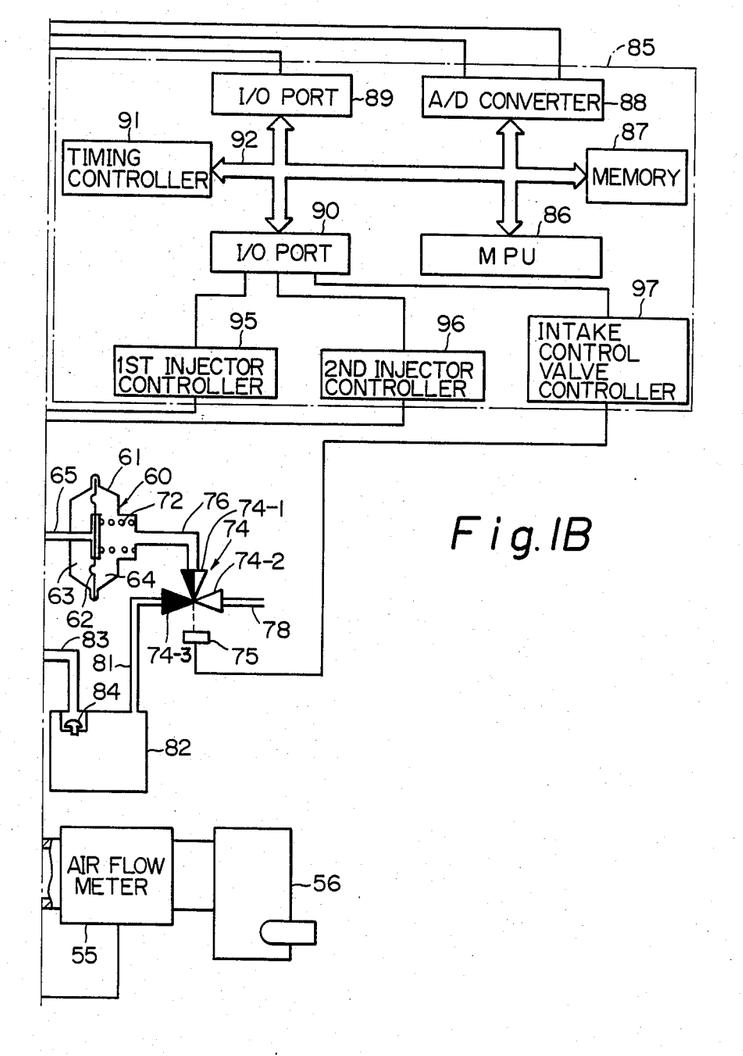
Figure 2:
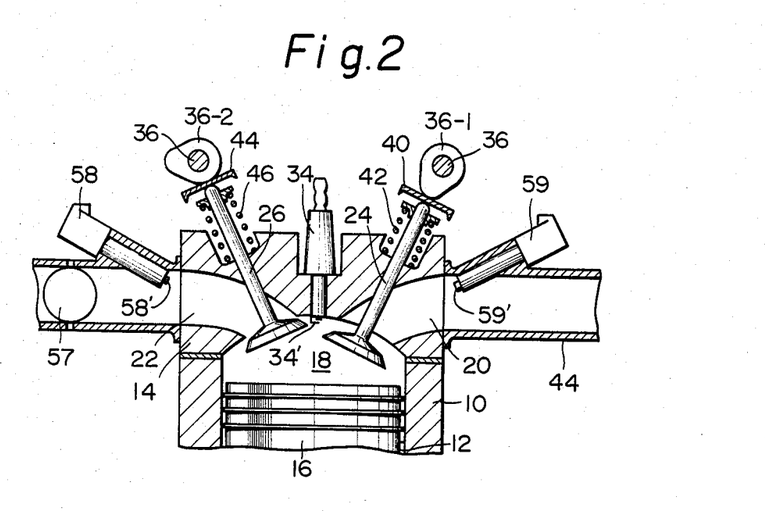
FIG. 2 is a sectional view taken along line II—II in FIG. 1.

An embodiment of the present invention will now be described with reference to FIGS. 1 and 2. In FIG. 2, reference numeral 10 designates a cylinder block defining therein a cylinder bore 12. A cylinder head 14 is connected to the cylinder block 10. A piston 16 is arranged in the cylinder bore 12 to form a combustion chamber 18 between the cylinder block 10, the cylinder head 14, and the piston 16. The cylinder head 14 is provided with first and second intake ports 20 and 22 opened to the combustion chamber 18 by way of intake valves 24 and 26. In this embodiment, as shown in FIG. 1, the cylinder head 14 is provided with a pair of exhaust ports 27 and 28 opened to the combustion chamber 18 by way of respective exhaust valves 30 and 32. As shown in FIG. 2, a spark plug 34 is connected to the cylinder head 14 so that a spark electrode 34' opens to the combustion chamber 18 at a position between the valves 24, 26, 30 and 32 at the center of the upper portion of the combustion chamber 18.

As shown in FIG. 1, a pair of camshafts 36 and 38 are arranged above the cylinder head 14 for operating the intake valves 24 and 26 and exhaust valves 30 and 32, respectively. The first camshaft 36 has first and second cam portions 36-1 and 36-2 as shown in FIG. 2. The first cam portion 36-1 contacts with a washer 40 on the upper end of the first intake valve 24 for operating the valve 24 against the force of a first valve spring 42. The second cam portion 36-2 contact with a washer 44 on the upper end of the second intake valve 26 for operating the valve 26 against the force of a spring 46. The second camshaft 38 has, as similar to the above, cam portions (not shown) for operating the exhaust valves 30 and 32, respectively.

As shown in FIG. 1, the first intake port 20 is a so-called "helical port" having a helically shaped end for generating a strong swirl motion of air in the cylinder bore 12. The second intake port 22 is, on the other hand, a so-called "straight port" for allowing the flow from the port 22 to directly reach the region near the spark electrode 34' arranged at the center of the upper portion of the combustion chamber 18.

To the ends of the first and the second intake ports 20 and 22 is connected an intake pipe 50. The intake pipe 50 has, at its downstream end, first and second passageways 50-1 and 50-2, which are separated from each other and connected to the first and second intake ports 20 and 22, respectively. The intake pipe 50 has, at its upstream end, a common passageway 50' which is connected to a surge tank 52. The surge tank 52 is connected to a throttle body in which a throttle valve 54 is arranged. Upstream of the throttle valve 54, an air-flow meter 55 and an air cleaner 56 are connected in series.

An intake control valve 57 is arranged in the intake pipe 50 at a position where the first and the second passageways 50-1 and 50-2 are divided. The intake control valve 57 is, in accordance with the operating condition of the engine, moved between a first position indicated by the solid line, where the straight second intake port 22 is connected to the common passageway 50' by the second passageway 50-2, and a second position as indicated by the dotted line, where the second intake port 22 is disconnected from the common passageway 50'. The first passageway 50-1, opened to the helically shaped first intake port 20, is always connected to the common passageway 50'.

A main fuel injector 58 is connected to the intake pipe 50 (FIG. 2) so that an injection nozzle 58' of the injector 58 opens to the second intake port 22 located downstream of the intake control valve 57.

Preferably, a sub-injector 59 is connected to the intake pipe 50 so that an injection nozzle 59' opens to the first intake port 20. As will be fully described later, the sub-injector 59 is substantially maintained closed during a partial load condition. The sub-injector 59 is operated only when the engine attains a full load operation.

Figure 3:
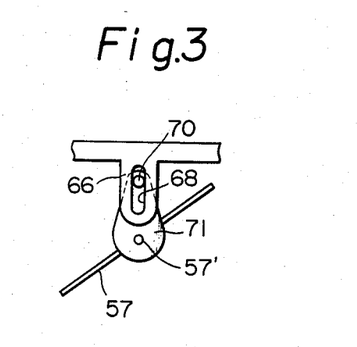
FIG. 3 is an enlarged view of the section of lever means in FIG. 1.

An actuator 60 is adapted for operating the intake control valve 57. The actuator 60 is of vacuum-operated type having a casing 61 and a diaphragm 62 arranged therein, so that an air chamber 63 and a vacuum control chamber 64 are formed on the sides of the diaphragm 62. Connected to the diaphragm 62 is a rod 65. As shown in FIG. 3, the rod 65 has, on an end opposite to the diaphragm 62, an ear 66 defining an elongated opening 68 to which a pin 70 is inserted. The pin 70 is fixed to an end of a lever 71 at a position spaced from the shaft 57' to which the intake control valve 57 is connected. As shown in FIG. 1, a spring 72 is arranged in the vacuum chamber 64 for urging the rod 65 so that the intake control valve 57 is moved to the open position as shown by the solid line to open the second intake port 22 when the chamber 64 is under atmospheric air pressure. When the chamber 64 is under vacuum pressure, the diaphragm 62 is moved against the force of the spring 72, so that the intake control valve 57 turns, as shown by the dotted line in FIG. 1, to close the second intake port 22.

A vacuum switching valve 74 is adapted for selectively introducing a vacuum signal or atmospheric air pressure signal into the chamber 64 of the actuator 60. The valve 74 is of a three-way solenoid type. The valve 74 is provided with a solenoid actuator 75, which causes, during the non-energized condition, connection of ports 74-1 and 74-2 with each other, so that the chamber 64 of the actuator 60 is connected to the atmosphere by way of pipes 76 and 78. When the solenoid 75 is energized, the port 74-1 is disconnected from the port 74-2 and is connected to the port 74-3, so that the control chamber 64 of the actuator 60 is opened to a vacuum port 80 formed in the intake pipe 50 via the pipe 76, a pipe 81, a pressure reservoir tank 82, a check valve 84, and a pipe 83.

Reference numeral 85 designates a control circuit for operating the main and sub-fuel injectors 58 and 59 as well as the intake control valve 57 in accordance with the operating condition of the engine. The control circuit 85 is, in this embodiment, constructed as a microcomputer system. The control circuit 85 has a microprocessing unit (MPU) 86, a memory 87, an analog-digital (A/D) converter 88, input-output (I/O) ports 89 and 90, a timing controller 91, and a bus 92 which connects these elements for transmission of commands and data.

Connected to the I/O port 89 is a crank angle sensor(s) 92 arranged adjacent to a magnetic piece 93 mounted on a shaft drivingly connected to the crankshaft, such as a distributor shaft, so as to provide pulse signals corresponding to predetermined crank angles. Connected to the A/D converter 88 is the air-flow meter 55, which detects the intake air amount, and a pressure sensor 94, which detects the pressure of the surge tank 52 at the position downstream from the throttle valve 54. The converter 88 changes the analog signals from the sensors 55 and 94 into digital signals.

Connected to the I/O port 90 is a first injector controller 95, a second injector controller 96, and an intake control valve controller 97. These controllers 95, 96, and 97 are connected to the main fuel injector 58, the sub-fuel injector 59, and the valve 74 for operating the intake control valve 57, respectively. As will be described later, the memory 87 has a program for controlling the injectors 58 and 59 and the intake control valve 57 in response to the signals from the sensors 55, 92, and 94 to attain desired control of the engine.

Figure 4:
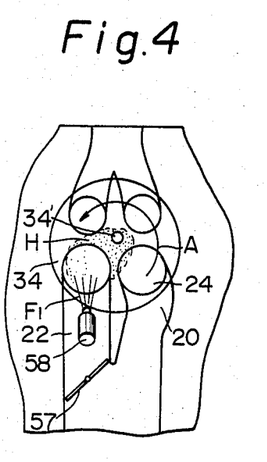
FIGS. 4 and 5 are a diagramatic plan and cross-sectional view, respectively, of a combustion chamber with the intake control valve in a closed condition.
Figure 5:
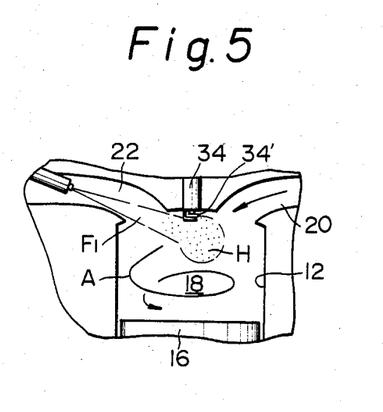

Prior to explaining the program, the operation of the system according to the present invention will be described. The description will first be made concerning the low load state. When the engine intakes a relatively small amount of air, as is the case in a low or medium speed or low or medium load, the control circuit 85 energizes the solenoid 75 to operate valve 74 and connect the ports 74-1 and 74-3. As a result, a vacuum signal from the vacuum port 80 is introduced into the chamber 64 of the actuator 60. This causes the diaphragm 62 to be displaced against the force of the spring 72. The rod 65 is thus moved to right (in FIG. 1) to turn the intake control valve 57 to the position shown by the dotted line, where the straight intake port 22 is disconnected from the intake pipe 50. Referring to FIGS. 4 and 5, the main fuel injector 58 injects fuel at the position of the piston 16 adjacent to the top dead center in the intake stroke while the sub-injector 59 is maintained unoperated. As a result, a flow of particulated fuel, as shown by an arrow F1, is introduced into the combustion chamber 18 at a moderate speed due to a small pressure difference existing between the combustion chamber 18 and the second intake port 22. Air from the intake pipe 50 is introduced into the cylinder bore 12 by way of the first port 20 to attain therein a swirl motion, as shown by an arrow A. Due to the prevention of the introduction of new air from the second port 22 closed by the intake control valve 57, the fuel from the main fuel injector 58 in the port 22 mainly accumulates, as shown by H, at the upper portion of the combustion chamber 18 near the electrode 34', while the flow of air in the cylinder bore 12 formed by the flow from the first port 20 prevents the combustible mixture at the top of the chamber 18 from being moved downward. This means that, at the position of the piston near the top dead center during the compression stroke, stratification of the combustible mixture is obtained, including a rich portion near the electrode 34' and a lean portion near the upper surface of the piston 16. As a result, the rich portion is easily ignited to generate flame to be transmitted to the lean portion to burn it. Such a stratified action enables the use of a totally very lean mixture as well as a large ratio of exhaust gas recirculation.

Figure 6:
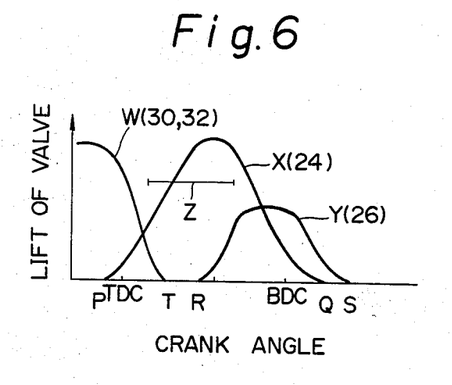
FIG. 6 shows the relationship between crank angle and valve lift of the intake and exhaust valves according to the present invention.

The opening and closing timing as well as the lift of the first and the second intake valves 24 and 26 are suitably determined by selecting the profiles of the cam portions 36-1 and 36-2 (FIG. 2) mounted on the camshaft 36. Preferable characteristics thus determined are shown in FIG. 6. As shown by the curve X, the first intake valve 24 in the helical port 20 begins to open at the timing P, which is slightly before the top dead center in the exhaust stroke, and completely closes at the timing Q, which is slightly after the bottom dead center in the compression stroke. The second intake valve 26 begins, as shown by the curve Y, to open at the timing R, which is after the end T of the close of the exhaust valves 30 and 32 (characteristic is shown by W) in the middle of the intake stroke, and completely closes at the timing S, which is after the close of the first intake valve 24. In other words, the timing R of opening of the second intake valve 26 is later than the timing P of opening of the first intake valve 24, and the timing S of closing of the second intake valve 26 is later than the timing Q of closing of the first intake valve 24. Although the engine may incorporate an apparatus for variable control of the valve timing, this relationship of the timings of the first and second intake valves 24 and 26 as well as the exhaust valves 30 and 32 should be maintained.

Due to the fact that the first intake valve 24 is first opened while the second intake valve 26 is closed, the swirl motion of the intake air in the cylinder bore 12 becomes very strong. During this period, as shown by Z in FIG. 6, the fuel from the main fuel injector 58 is injected. The injected fuel stays in the second intake port 22 for a while since the second intake valve 26 is maintained closed until the timing R. Since the second intake valve 26, during the preceding cycle, finishes closing at a timing corresponding to S in the middle of the compression stroke, a rather high positive pressure is maintained in the second intake port 22, so that a flow of a rich air-fuel mixture in the second intake port 22 introduced into the combustion chamber 18 as shown by the arrow F1 is obtained when the second intake valve 26 is opened at the timing of R, irrespective of the fact that the intake control valve 57 is in its closed condition, as shown by the dotted line in FIG. 1. Therefore, the previously mentioned stratification including the region of a very rich air-fuel mixture in the combustion chamber 18 near the electrode 34' and a region of a very lean air-fuel mixture in the combustion chamber 18 near the piston upper surface is effectively obtained by the timing of the intake valves 24 and 26 and the exhaust valves 30 and 32. The thus stratified construction of the air-fuel mixture is, due to the swirl motion of the air A in the cylinder bore 12, effectively maintained until the piston 16 attains the top dead center position during the compression stroke.

As is already mentioned, the second intake valve 26 is closed at the timing S (FIG. 6) in the compression stroke to generate a relatively high pressure in the second intake port 22 thereafter, which pressure helps to generate a strong swirl. However, if this effect is too strong, the stratification is weakened. Therefore, the timing of closing of the second intake valve 26 should be selected to obtain good stratification.

Now, the operation of the embodiment under high load will be explained. When the engine is operated under a high speed or high load condition, the control circuit 85 opens the intake control valve 57 as shown by the solid line in FIG. 1. In this case, the air in the intake pipe 50 is introduced into the combustion chamber 18 not only through the first intake port 20 but also through the second intake port 22. Therefore, no swirl motion of the intake air takes place in the cylinder bore 12, so that the air-fuel mixture is equally distributed in the combustion chamber 18. In this case, the air-fuel ratio is determined so that it is near the theoretical air-fuel ratio. Thus, a high speed or high load operation can be attained. In this high load condition, the fuel injection should be effected at a timing other than the intake stroke, allowing fuel to be held in the second intake port 22 for a while and enabling a flow of highly particulated fuel. In order to do this, it is possible to operate the injectors 58 (and 59) separately at timings other than the intake stroke. In place of separately operating the injectors, the injectors may simultaneously be operated at predetermined crank angles.

Figure 7:
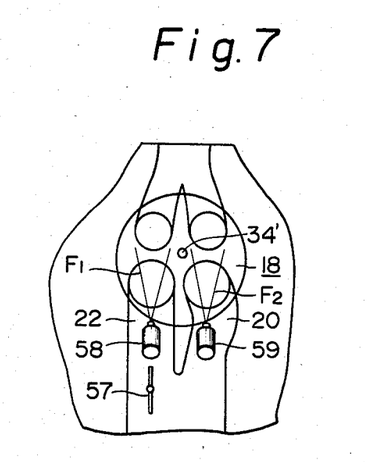
FIG. 7 is a diagramatic plan view of a combustion chamber during a high load condition.

During a high speed or high load condition, it is possible to operate only the main fuel injector 58 as similar to the low speed or low load condition. However, it is preferable to operate, in addition to the main fuel injector 58, the sub-injector 59 in the first intake port 20. Therefore, as schematically shown in FIG. 7, flows $F_1$ and $F_2$ of air-fuel mixture of substantially equal air-fuel ratios are introduced into the combustion chamber 18 from the first and second intake ports 20 and 22. As a result of this, the air-fuel ratio of the combustible mixture is equalized, allowing stable operation of the engine even if it is cold. Torque variation is also prevented, making it is possible to obtain high fuel consumption efficiency as well as low emission of toxic components in the exhaust gas.

The operation of the embodiment under transient states will now be explained. During the transient states wherein the intake control valve 57 is moved from the closed condition to open condition, the fuel injection is changed from a state wherein only the main fuel injector 58 is operated to a state wherein, in addition to the main fuel injector 58, the sub-injectors 59 are operated. In this case, there is some difference in air-fuel ratio between the first intake port 20 and the second intake port 22, which causes a momentary, unstable phenomena, such as torque variation. To overcome this drawback, it is advisable to operate the sub-injector 59 prior to the beginning of the switching of the intake control valve 57.

Substantially the same discussion applies to the situation wherein the intake control valve 57 is moved from the open condition to closed condition. In order to maintain stable operation of the engine during this transient state, the sub-injector 59 is preferably maintained to operate for a while just after the intake control valve 57 begins to close.

Figure 8:
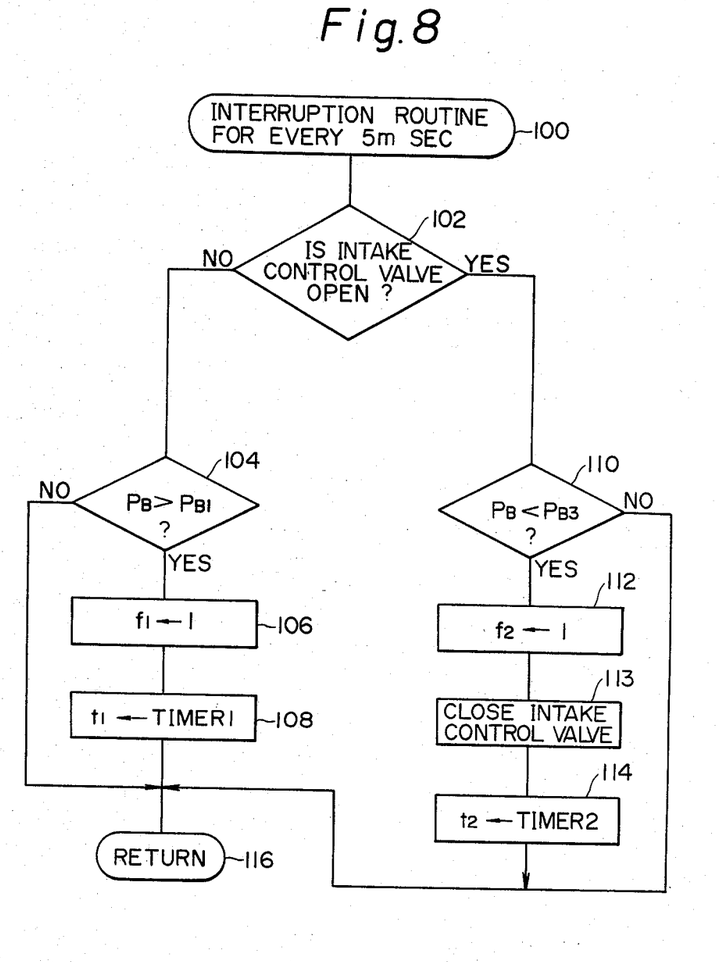
Figure 12A:
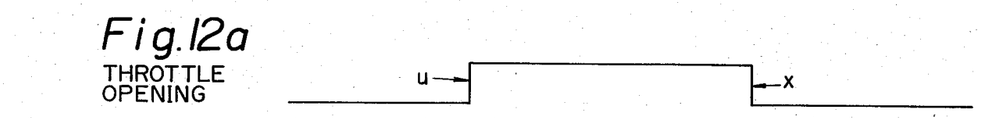
Figures 12B, 12C, 12D:
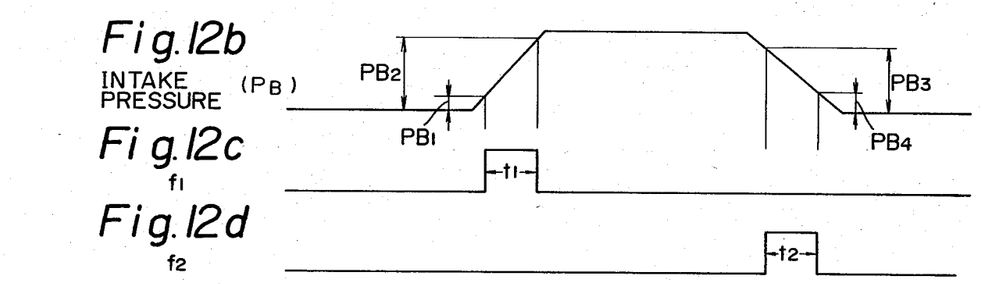

Now, the software for attaining the above-mentioned operation of the engine according to the present invention will be described. FIG. 8 shows a routine for controlling the vacuum switching valve 72, i.e., the intake control valve 57 connected to the actuator 60. At point 100, a calculation is effected every predetermined period, such as 5 msec. At point 102, the MPU 86 in FIG. 1 discriminates whether or not the intake control valve 57 is open. If the result at point 102 is "no", the program proceeds to a point 104, where it is discriminated whether the intake pressure $P_B$ sensed by the pressure sensor 94 is higher than a predetermined level $P_{B1}$ (FIG. 12-(b)). If the result at point 104 is "no", the engine is under a low load condition. Thus, the program proceeds to a point 116 to return to the main routine. Thus, the intake control valve 57 is maintained in the closed condition.

If the result at point 104 is "yes", the engine is changing from a low load state to a high load state, as shown by u in FIG. 12-(a), wherein the throttle valve 54 is opened. At point 106, the flag $f_1$ is set, which indicates a transient state from the closed condition of the intake control valve 57 to the open condition of the same. This flag $f_1$ is used in the fuel injection routine, as will be fully described later. At point 108, a timer 1 is set to $t_1$, which corresponds to a delay of switching of the intake control valve 57 from the closed position to the open position. As will be fully described later, during this delay time $t_1$, the injection from the sub-injector 59 is commenced prior to switching of the intake control valve 57.

Figure 9:
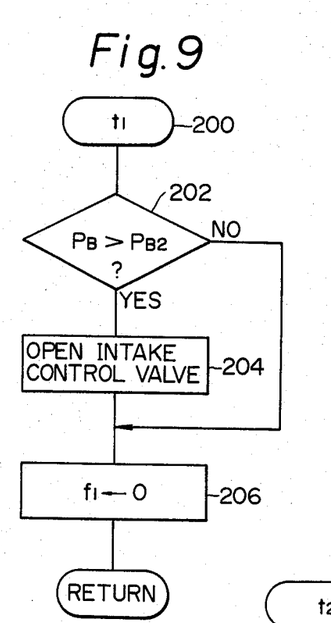
Figure 12E:
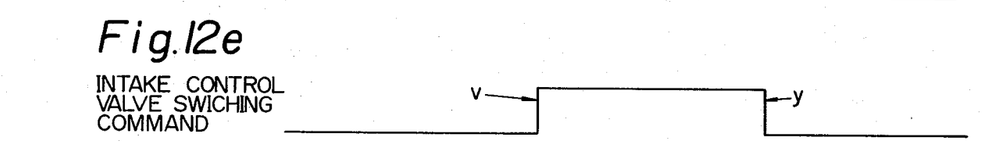
Figure 12F:
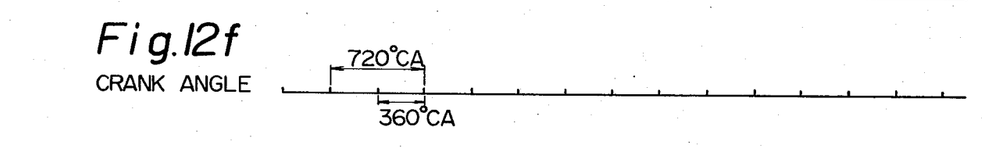

When the time $t_1$ elapses, a time interruption routine shown in FIG. 9 is commenced at a point 200. At point 202, it is discriminated whether the intake pressure sensed by the sensor 94 is higher than a predetermined value $P_{B2}$ (FIG. 12-(b)). If the result at point 202 is "yes", the program proceeds to a point 204 where the MPU 86 allows the I/O port 90 to issue a signal directed to the intake control valve controller 97 so that the solenoid 75 is deenergized at the point V in FIG. 12(e). As a result, the switching valve 74 assumes a position where the port 74-1 and 74-2 are connected, so that the chamber 64 is opened to the atmosphere. Thus, the actuator 60 turns the intake control valve 57 to open the second intake port 22 to the intake pipe 50. The program then proceed to a point 206, where the flag $f_1$ is reset, which indicates the end of the transient state of the valve 57 from the closed condition to the open condition.

If the result of the discrimination at point 202 is "no", the program directly proceeds to point 206. As a result, the intake control valve 57 is maintained closed.

In FIG. 8, if the intake control valve 57 is open, then the result of the discrimination at point 102 is "yes". The program then proceeds to a point 110, where it is discriminated whether the intake pressure detected by the pressure sensor 94 is lower than a predetermined value $P_{B3}$. A "no" result of discrimination at point 110 means that the load of the engine is now high. In this case, the program returns to the main routine at the point 106, so as to maintain the intake control valve 57 open.

A "yes" result of discrimination at point 110 means that the engine load is now changed to low, as shown by x in FIG. 12-(a). In this case, the program proceeds to a point 112 where a flag $f_2$ is set, which indicates a transient state from the open condition of the intake control valve 57 to the closed condition of the same. The program then proceeds to a point 113, where the MPU 86 sets the port 90 so as to cause the controller 97 to energize the solenoid 75 (FIG. 12-(e): y). As a result, the switching valve 74 assumes a position where the port 74-1 and 74-3 are connected with each other, so that the chamber 64 is opened to the vacuum port 80. Thus, the diaphragm 62 is moved against the force of the spring 72 to turn the intake control valve 57 to the closed condition, as shown by the dotted line in FIG. 1. At point 114, a timer 2 is set to $t_2$, corresponding to the delay time of stoppage of the sub-injector 59 during the transient state of the intake control valve 57 from the open condition to the closed condition.

Figure 10:
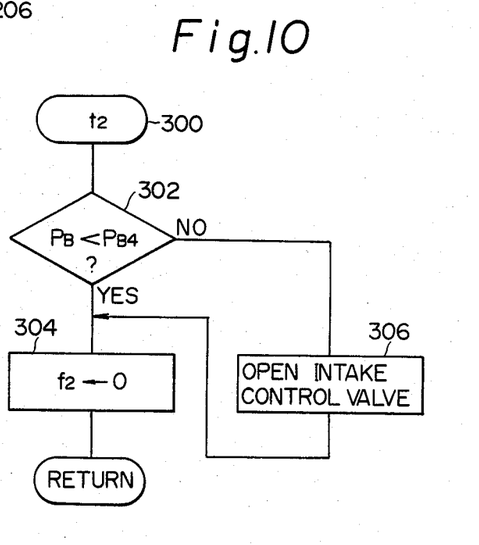

When the time $t_2$ elapses, a time interruption routine as shown in FIG. 10 is commenced at point 300. At the following point 302, it is judged whether the intake pressure detected by the sensor 94 is smaller than a predetermined value $P_{B4}$. If the result of discrimination at point 302 is "yes", the program proceeds to a point 304 where the flag $f_2$ is reset, indicating completion of the transient state of the intake control valve 57 from the open condition to the closed condition.

If the intake pressure does not decrease to the predetermined value $P_{B4}$ during the period $t_2$, then the result of the discrimination at point 302 is "no". In this case, the program proceeds to a point 306, where the gate 97 deenergizes the solenoid 75, so that the intake control valve 57 is opened.

Figure 11A:
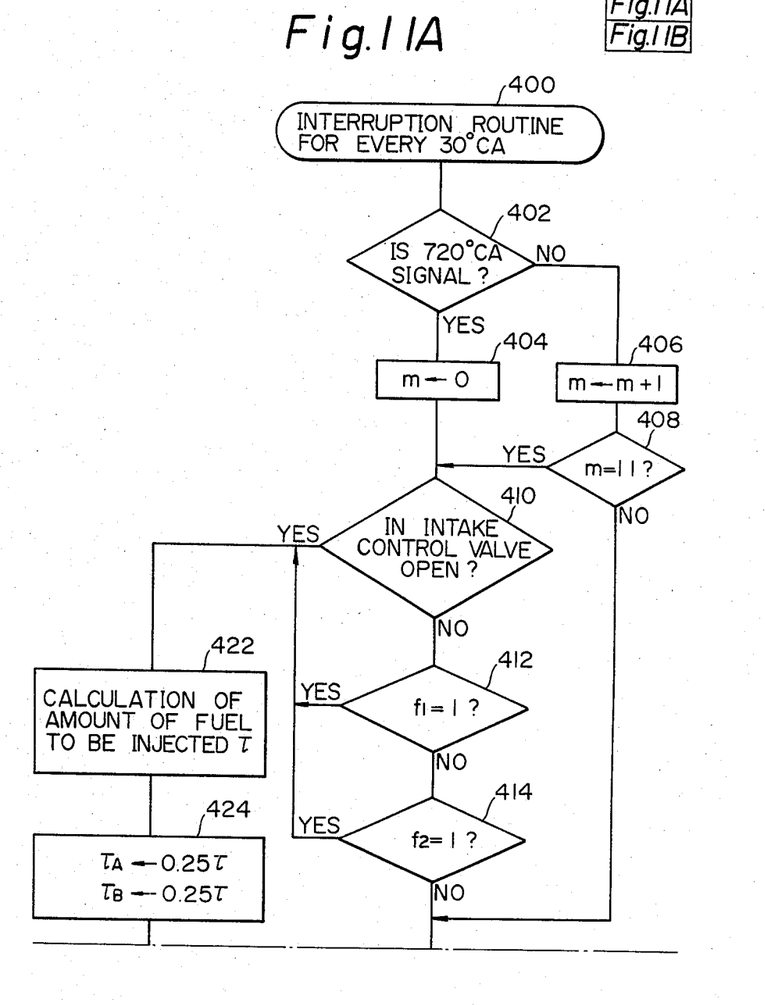
Figure 11B:
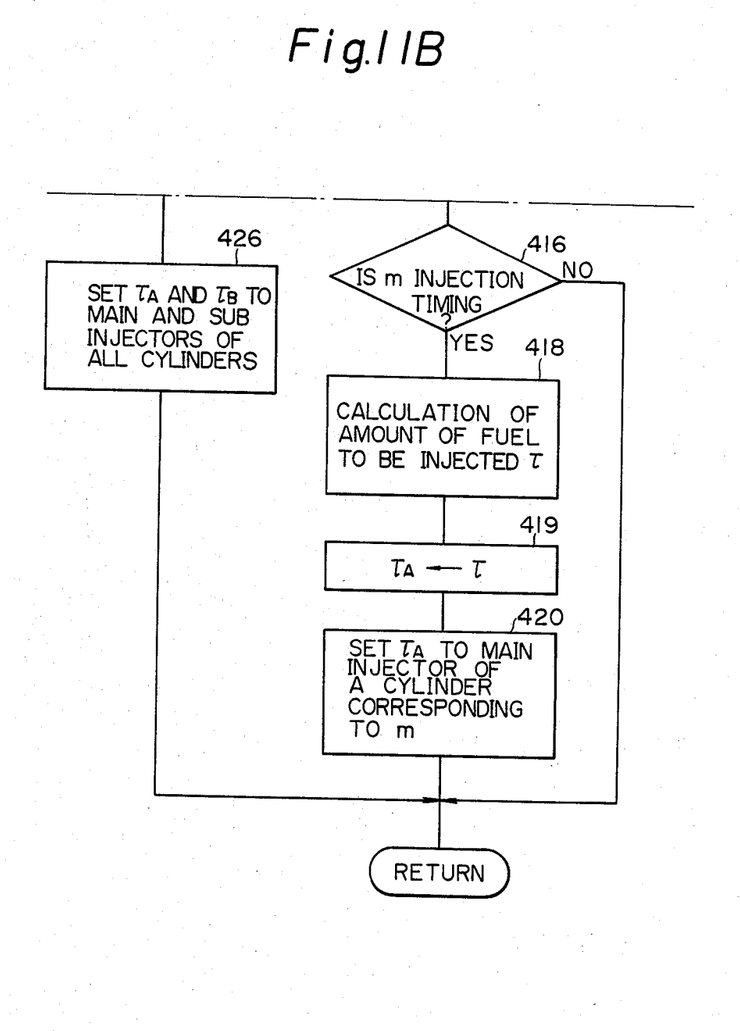

FIG. 11 is a fuel injection routine. At point 400, calculation is entered upon reception of a signal from the crank angle sensor 92 issued at every 30° crank angle period. At point 402, it is judged whether the engine has attained a single cycle rotation by detecting a standard signal from the crank angle sensor 92, which standard signal is issued at every 720° crank angle rotation. When the position of the crank shaft is at the predetermined angle in every one cycle of the engine, the result of the discrimination at point 402 is "yes". Then, at point 404, the count m of a counter is reset (m=0). If the result of discrimination at point 402 is "no", the program then proceeds to a point 406, where count m is incremented. As will be clear from the above, the count m is incremented for every 30° CA in every single engine cycle (720° CA). Thus, it is possible to detect the actual crank angle position from the count m. At point 408, it is judged whether the count m is 11.

At point 410, it is judged whether the intake control valve 57 is open. If the result of discrimination at point 410 is "no" (closed condition), the program proceeds to points 412 and 414, where it is judged whether $f_1=1$ and $f_2=1$, respectively. During the closed condition of the intakes control valve 77, the flags $f_1$ and $f_2$ are both zero (FIGS. 12-(c) and (d)). Thus, the results of discrimination at points 412 and 414 are both "no". Thus, the program is now at a point 416, after which independent injection control of the main fuel injector 58 is attained.

At point 416, it is discriminated whether the count m represents a crank angle to commence fuel injection. As already explained, when the intake control valve 57 is closed, the fuel injection of the respective cylinders should be commenced at the point near the top dead center in the intake strokes of the respective cylinders. These points are equidistantly located in the engine, one cycle for every 180° crank angle for four-cylinder engines or for every 120° crank angle for six-cylinder engines. The count m is incremented for every 30° crank angle (point 406). Thus, it is possible to determine from the count m whether the fuel injection should be attained and, if so, at what cylinder fuel injection should be effected.

Figure 12G:
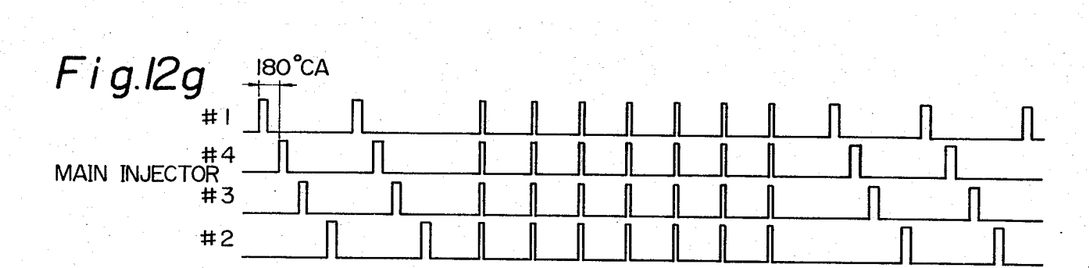
Figure 12H:
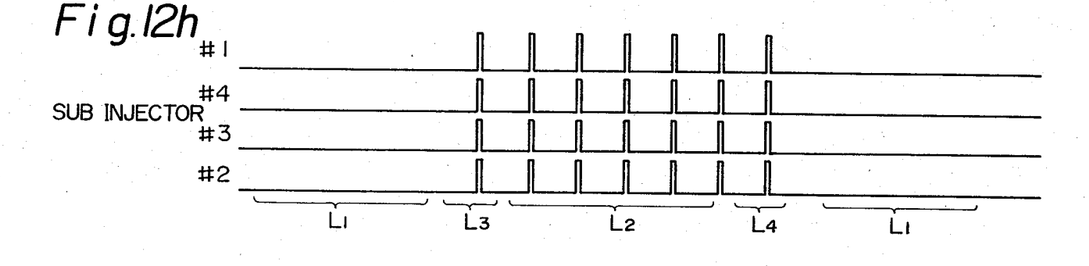

If the result of the discrimination at point 416 is "yes", the program proceeds to a point 418, where the amount of fuel to be injected, $\tau$, is calculated. This calculation is, as well known to those skilled in this art, effected by detecting engine conditions, such as intake pressure detected by the pressure sensor 94 and engine rotational speed detected by the crank angle sensor 92, as well as other sensors (not shown), including the air-fuel ratio sensor and temperature sensors. The program then proceeds to a point 419, where $\tau$ is moved to $\tau_A$, and to point 420, where the MPU 86 sets $\tau_A$ to the I/O port 90 so that the timing controller 91 controls the first injector controller 95 so that the first injector 58 attains the desired amount of fuel injection of $\tau_A$. The pattern of the independent injection of each injector 58 during this low load wherein the intake control valve is closed is shown by $L_1$ in FIG. 12-(g) and (h).

When the count m is 0 or 11, which occurs every 360° crank angle, the program is inevitably located at point 410, since the result of discrimination at point 402 or 408 is "yes". When the intake control valve 57 is open, the result of discrimination at point 410 is "yes" and the program proceeds to point 422, where an amount of fuel $\tau$ to be injected is calculated by signals from the crank angle sensor 92 (corresponding to the rotational speed of the engine) and air-flow meter 55 (corresponding to the amount of the intake air), as well known to those skilled in this art. At the next point 424, injection periods $\tau_A$ and $\tau_B$ for the main fuel injector 58 and the sub-injector 59 are calculated, by multiplying by 0.25 the $\tau$ calculated at the point 422. The data related to the calculated injection periods $\tau_A$ and $\tau_B$ are set to the I/O port 90 for allowing the timing controller 91 to control the first and the second controllers 95 and 96 so that all of the main and sub-injectors 58 and 59 for the respective cylinders attain the desired amount of injection of $\tau_A$ and $\tau_B$. As clear from the above, the open condition of the intake control valve 57 due to the high load of the engine permits all of the injectors of every cylinder to be simultaneously operated while the amount of fuel from the main fuel and the sub-injectors 58 and 59 for each of the cylinders is maintained equal at every 360° crank angle. The pattern of the simultaneous fuel injection at the high load where the intake control valve 57 is open is shown by $L_2$ in FIG. 12-(g) and (h).

When the intake control valve 57 is under a transient state, from its closed condition to the open condition, the flag $f_1$ is set at point 106 in FIG. 8. Thus, the result of discrimination at point 412 is "yes". Thus, the program proceeds to the routines below point 422, to attain simultaneous injection. This means that prior to the opening of the intake control valve 57 (FIG. 12-(e), v), in addition to the main fuel injectors 58, the sub-injectors 59 are operated for the period of $t_1$ (FIG. 12-(c)). As a result, variation of the air-fuel ratio is prevented when the opening of the intake control valve 57 is commenced after that period. The pattern of fuel injection during this transient state is shown by $L_3$ in FIG. 12.

When the intake control valve 57 is under the transient state from its open condition to the closed condition, the flag $f_2$ is set at point 112 in FIG. 8. Thus, the result of discrimination at point 414 in FIG. 11 is "yes". Thus, the program proceeds to a routine below the point 422 to attain simultaneous injection of the main fuel and sub-injectors 58 and 59 at every 360° crank angle. This means the sub-injectors 59 are maintained open for a period $t_2$ (FIG. 12-(d)) after the intake control valve 57 begins to close. The pattern of the fuel injection during this transient state is shown by $L_4$ in FIG. 12.

Figure 13:
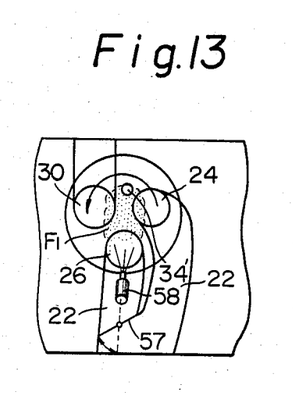
FIG. 13 is a schematical plan view of the combustion chamber according to a second embodiment of the present invention.

While the above embodiment is explained with regard to application to the so-called four-valve engine, it is also applicable to the so-called three-valve engine as shown in FIG. 13. In this embodiment, the sub-injector 59 mounted in the helical intake port 22 in the previous mentioned embodiment is eliminated. Further, the first intake valve and an exhaust valve 30 are operated by the camshaft, while the second intake valve 26 is operated by another camshaft. In this case, it is possible for the flow $F_1$ of fuel from the second intake port 22 to be highly concentratedly directed to the center portion of the combustion chamber 18. Thus, a richer mixture may be formed adjacent to the ignition electrode 34', which allows an increase in the ignitable lean limit.

In the explained embodiment, the control of intake control valve 57 is attained by detecting the intake pressure. In place of this, the intake control valve may be controlled by other engine conditions, such as the rotational speed or throttle opening, or combinations of these conditions.

In the embodiment, the operation of the sub-injector 59 during the transient state of the intake control valve 57 is attained by injection attained synchronously with every 360° crank angle. In place of this, sub-injector 59 is operated non-synchronously with the crank angle during the transient state. Such non-synchronous injection would occur by detecting the transient state of the intake control valve for a predetermined fixed or varied period.

Many modifications and changes may be made by those skilled in the art without departing from the scope of the invention.

We claim:
1. An internal combustion engine, comprising:
 a cylinder block defining a cylinder bore;
 a cylinder head arranged on the cylinder block;
 a piston movably arranged in the cylinder bore so that a combustion chamber is formed between the cylinder block cylinder head, and the piston;
 said cylinder head having a first intake port of a helical shape and a second intake port of a straight shape;
 a first intake valve arranged between the first intake port and the combustion chamber,
 a second intake valve arranged between the second intake port and the combustion chamber,
 said cylinder head having at least one exhaust port;
 an exhaust valve arranged between the exhaust port and the combustion chamber;
 intake valve control means for controlling the operation of the first and the second intake valves;
 exhaust valve control means for controlling the operation of the exhaust valve;
 a spark plug having a spark gap located in the combustion chamber at its top portion in the center;
 intake pipe means connected to the first and second intake ports for introduction of intake air;
 intake control valve means for controlling the supply of air from the intake pipe means to the second intake port of a straight shape;

actuator means responsive to operating conditions of the engine for controlling the opening of the intake control valve means;

main injector means for generating a flow of fuel in the second intake port;

first injection control means for controlling the fuel injection from the main injector means in such a anner that the flow of fuel is injected substantially at the intake stroke of the piston when the intake control valve is closed; and second injection control means for controlling the main fuel injection from the injector means in such a manner that the flow of fuel is injected at a crank angle area substantially other than that of the intake stroke then the intake control valve is opened.

2. An internal combustion engine according to claim 1, wherein said injection from the main injector means during the closed condition of the intake control valve means is commenced at about the middle of the intake stroke of each cylinder and ended at about the end of the intake stroke of each cylinder.

3. An internal combustion engine according to claim 1, wherein said injection from the main injector means during the opening of the intake control valve means is attained at a timing not in the intake stroke of each of the cylinders.

4. An internal combustion engine according to claim 1, wherein said engine is provided with a plurality of cylinders, said second injection control means comprises means for detecting at least one predetermined crank angle in an engine cycle and means for operating each main injector means simultaneously at said predetermined crank angle.

5. An internal combustion engine according to claim 1, further comprising a sub-injector arranged in said first intake port, first means for controlling the sub-injector in such a manner that said sub-injector is substantially maintained closed when the intake control valve is closed, and second means for controlling the sub-injector in such a manner that the sub-injector injects an amount of fuel which is substantially equal to the amount of fuel to be injected from the main injector means when the intake control valve means is opened.

6. An internal combustion engine according to claim 5, further comprising means for detecting a short period just after the intake control valve means begins to close and means for allowing the sub-injector to open during said period.

7. An internal combustion engine according to claim 5, further comprising means for detecting a short period just before the intake control valve means begins to open and means for allowing the sub-injector to operate at said period.

8. An internal combustion engine according to claim 1, wherein said intake valve control means comprises first cam means for controlling the first intake valve and second cam means for controlling the second intake valve, the arrangement of the first and second cam means being such that the timing of opening of the second intake valve is later than the timing of opening of the first intake valve during the intake stroke.

9. An internal combustion engine, according to claim 1, wherein said intake valve means comprises first cam means for controlling the first intake valve and second cam means for controlling the second intake valve, the arrangement of the first and the second cam means being such that the timing of closing of the second intake valve is later than the timing of closing of the first intake valve.

10. An internal combustion engine according to claim 1, wherein the arrangement of the intake valve control means and the exhaust valve control means is such that the timing of the opening of the second intake valve is later than the timing of closing of the exhaust valve.

11. An internal combustion engine according to claim 1, wherein said cylinder head is provided with two exhaust ports, two exhaust valves being mounted for the exhaust ports, respectively.

* * * * *